(12) United States Patent
Proctor, Jr.

(10) Patent No.: US 6,956,840 B1
(45) Date of Patent: Oct. 18, 2005

(54) POWER CONTROL PROTOCOL FOR HIGHLY VARIABLE DATA RATE REVERSE LINK OF A WIRELESS COMMUNICATION SYSTEM

(75) Inventor: James A. Proctor, Jr., Indialantic, FL (US)

(73) Assignee: IPR Licensing, Inc., Wilmington, DE (US)

( * ) Notice: Subject to any disclaimer, the term of this patent is extended or adjusted under 35 U.S.C. 154(b) by 0 days.

(21) Appl. No.: 09/158,421

(22) Filed: Sep. 21, 1998

(51) Int. Cl.[7] .......................... H04B 1/00; H04B 7/00; H04B 7/216
(52) U.S. Cl. .................... 370/342; 455/522; 455/69
(58) Field of Search .............................. 370/329, 335, 370/342, 441, 468, 479, 311, 465; 455/436, 455/450, 522, 69

(56) References Cited

U.S. PATENT DOCUMENTS

| | | | |
|---|---|---|---|
| 4,222,115 A | | 9/1980 | Cooper et al. .................. 375/1 |
| 5,056,109 A | | 10/1991 | Gilhousen et al. .............. 375/1 |
| 5,257,283 A | | 10/1993 | Gilhousen et al. .............. 375/1 |
| 5,442,625 A | | 8/1995 | Gitlin et al. .................... 370/18 |
| 5,446,756 A | | 8/1995 | Mallinckrodt ............... 375/200 |
| 5,485,486 A | | 1/1996 | Gilhousen et al. ........... 375/205 |
| 5,491,717 A | * | 2/1996 | Hall ............................ 370/332 |
| 5,604,730 A | | 2/1997 | Tiedemann, Jr. ............. 370/252 |
| 5,619,525 A | * | 4/1997 | Wiedeman et al. .......... 375/130 |
| 5,715,516 A | * | 2/1998 | Howard et al. ............... 455/422 |
| 5,715,526 A | | 2/1998 | Weaver, Jr. et al. ......... 455/126 |
| 5,742,595 A | * | 4/1998 | Bhagalia ...................... 370/342 |
| 5,748,104 A | * | 5/1998 | Argyroudis et al. ...... 340/870.11 |
| 5,799,005 A | * | 8/1998 | Soliman ...................... 370/335 |
| 5,805,585 A | * | 9/1998 | Javitt et al. .................. 370/342 |
| 5,809,093 A | | 9/1998 | Cooper ....................... 375/365 |
| 5,892,758 A | * | 4/1999 | Argyroudis .................. 370/335 |
| 6,028,868 A | * | 2/2000 | Yeung et al. ................ 370/515 |
| 6,064,662 A | * | 5/2000 | Gitlin et al. ................. 370/330 |
| 6,081,536 A | * | 6/2000 | Gorsuch et al. ............. 370/468 |
| 6,272,340 B1 | * | 8/2001 | Wright et al. ............... 455/427 |
| 6,452,913 B1 | * | 9/2002 | Proctor, Jr. .................. 370/335 |
| 2002/0118653 A1 | * | 8/2002 | Lomp et al. ................. 370/311 |
| 2003/0118081 A1 | * | 6/2003 | Philips et al. ............... 375/130 |

* cited by examiner

*Primary Examiner*—Seema S. Rao
*Assistant Examiner*—Kevin C. Harper
(74) *Attorney, Agent, or Firm*—Hamilton, Brook, Smith & Reynolds, P.C.

(57) ABSTRACT

A technique for implementing closed loop power control in a Code Division Multiple Access (CDMA) type wireless system which dynamically assigns coded channels on a demand basis. The technique maintains a proper power level, even when no traffic channels are allocated, by determining a link quality metric based upon the reverse link power received. This determination is made in response to a heartbeat signal sent at a rate which is only sufficiently fast to maintain code phase lock, for example, depending upon the expected maximum rate at which the subscriber unit will travel.

30 Claims, 4 Drawing Sheets

POWER CONTROL PROTOCOL FOR HIGHLY VARIABLE DATA RATE REVERSE LINK OF A WIRELESS COMMUNICATION SYSTEM

BACKGROUND OF THE INVENTION

The increasing use of wireless telephones and personal computers has led to a corresponding demand for advanced telecommunication services that were once thought to only be meant for use in specialized applications. In the 1980's, wireless voice communication became widely available through the cellular telephone network. Such services were at first typically considered to be the exclusive province of the businessman because of expected high subscriber costs. The same was also true for access to remotely distributed computer networks. Until very recently, only business people and large institutions could afford the necessary computers and wireline access equipment. As a result of the widespread availability of both technologies, the general population now increasingly wishes to not only have access to networks such as the Internet and private intranets, but also to access such networks in a wireless fashion as well. This is particularly of concern for the users of portable computers, laptop computers, hand-held personal digital assistants and the like who would prefer to access such networks without being tethered to a telephone line.

There still is no widely available satisfactory solution for providing low cost, high speed access to the Internet, private intranets, and other networks using the existing cellular wireless infrastructure. This situation is most likely an artifact of several unfortunate circumstances. For one, the typical manner of providing high speed data service in the business environment over the wireline network is not readily adaptable to the voice grade service available in most homes or offices. Such standard high speed data services also do not lend themselves well to efficient transmission over standard cellular wireless handsets. Furthermore, the existing cellular network was originally designed only to deliver voice services. As a result, the emphasis in present day digital wireless communication schemes lies with voice, although certain schemes such as IS-95B do provide some measure of asymmetrical behavior for the accommodation of data transmission. For example, the data rate on an IS-95B forward traffic channel can be adjusted in increments from 1.2 kbps up to 9.6 kbps for so-called Rate Set 1 and in for increments from 1.8 kbps up to 14.4 kbps for Rate Set 2. On the reverse link traffic channel, however, the data rate is fixed at 4.8 kbps.

Existing systems therefore typically provide a radio channel which can accommodate maximum data rates only in the range of 14.4 kilobits per second (kbps) at best in the forward direction. Such a low data rate channel does not lend itself directly to transmitting data at rates of 28.8 or even 56.6 kbps that are now commonly available using inexpensive wireline modems, not to mention even higher rates such as the 128 kbps which are available with Integrated Services Digital Network (ISDN) type equipment. Data rates at these levels are rapidly becoming the minimum acceptable rates for activities such as browsing web pages. Other types of data networks using higher speed building blocks such as the Digital Subscriber Line (xDSL) service are also now coming into use in the United States.

Although such networks were known at the time that cellular systems were originally deployed, for the most part, there is no provision for providing higher speed data services over cellular network topologies. Unfortunately, in wireless environments, access to the channels by multiple subscribers is expensive and there is competition for them. Whether the multiple access is provided by the traditional Frequency Division Multiple Access (FDMA) using analog modulation on a group of radio carriers, or by newer digital modulation schemes the permit sharing of a radio carrier using Time Division Multiple Access (TDMA) or Code Division Multiple Access (CDMA), the nature of the radio spectrum is that it is a medium that is expected to be shared. This is quite dissimilar to the traditional environment for data transmission, in which the wireline bandwidth is relatively wide, and is therefore not typically intended to be shared.

CDMA type multiple access schemes are generally thought to, in theory, provide the most efficient use of the radio spectrum. CDMA schemes only work well, however, when the power levels of individual transmissions are carefully controlled. Present day CDMA wireless systems such as IS-95B use two different types of power control on the uplink in order to ensure that a signal from a given subscriber unit arriving at the base station does not interfere in a disruptive manner with the signals arriving from other subscriber units. In a first process, referred to as open loop power control, a rough estimate of the proper power control level is established by the mobile subscriber unit itself. In particular, after a call is established and as the mobile moves around within a cell, the path loss between the subscriber unit and the base station will continue to change. The mobile continues to monitor the receive power and adjust its transmit power. In particular, the mobile measures a power level on the forward link signal as received from the base station and then sets its reverse link power accordingly. Thus, for example, if the receive power level is relatively weak, then the mobile assumes that it is relatively distant from the base station and increases its power level. The converse is true, in that a signal received at a relatively high level indicates that the mobile is relatively close to the base station and therefore should be transmitting with reduced power.

Since the forward and reverse links are on different frequencies, however, open loop power control is inadequate and too slow to compensate for fast Rayleigh fading. In other words, since Rayleigh fading is frequency dependent, open loop power control alone cannot compensate for it completely in CDMA systems.

As a result, closed loop power control is also used to compensate for power fluctuations. In the closed loop process, once the mobile obtains access to a traffic channel and begins to communicate with the base station, the base station continuously monitors the received power level on the reverse link. If the link quality begins deteriorating, the base station sends a command to the mobile via the forward link to increase its power level. If the link quality indicates excess power on the reverse link, the base station commands the mobile unit to power down.

In the IS-95B standard, the base station sends such power control commands to the mobile using a specially encoded message sent on a forward link traffic channel. These embedded messages contain power control commands in the form of so-called power control bits (PCBs). The amount of power increase and power decrease per each bit is nominally specified at +1 dB and −1 dB. The response of the mobile to these power control bits is typically expected to be very fast in order to compensate for fast Rayleigh fading. For this reason, these bits are directly sent over the traffic channel. In particular, certain selected bits from the baseband stream are inserted or "punctured" into the traffic stream to provide a separate power control sub-channel at a rate of 800 bits per second. The mobile unit thus continuously receives power control bits every 1.25 ms via such bit "puncturing."

SUMMARY OF THE INVENTION

Problem Statement

There recently have been developed certain optimizations of CDMA systems for data transmission. These systems use certain coded phase channel allocation schemes that take away coded phase channels when they are not in use and then reassign them to provide more efficient use of the radio spectrum. Ideally, coded phase channels may be allocated as rapidly as possible to different connections while minimizing radio frequency signaling needed. However, a virtual connection must remain open between each mobile unit and the base station whether a coded phase channel is in use or not. Otherwise, it is necessary to reacquire synchronization, for example, each time that a channel is allocated or deallocated from a particular connection.

Unfortunately, especially for the case of attempting to implement the closed loop power control signaling, there is no active traffic channel in which to embed power control bits every 1.25 milliseconds (ms). It would be impractical to have to reacquire the proper power level each time that a new code phase channel is allocated.

It is therefore desirable to maintain the proper power level on the reverse link even as code phase channels are deallocated from a particular connection.

BRIEF DESCRIPTION OF THE INVENTION

The present invention is a technique for implementing a code division multiple access system which dynamically assigns coded traffic channels on a demand basis. The technique maintains a known transmit power level for the reverse link channel equipment even when the subscriber unit has entered a standby mode in which no traffic channels are active.

This is accomplished in the standby mode by having the base station measure certain quality parameters of a maintenance heartbeat signal which is periodically sent on a reverse channel by a subscriber unit when in standby mode. The heartbeat signal is a minimal signal sent at a rate which is only sufficient to maintain code phase lock between the subscriber unit and the base station. The rate at which heartbeat signals are sent depends upon the maximum expected rate of physical movement of the subscriber unit. For example, in systems expected to support walking speed-type mobility, the heartbeat signal need only be sent every few seconds.

The link quality parameters are preferably a bit error rate measurement, but may also be a noise level measurement or signal power level measurement.

The link quality information is then sent from the base station to the subscriber unit typically formatted as a link quality report message. The link quality reports are sent on a forward link paging or sync channel to a subscriber unit in standby mode.

The subscriber unit then uses the link quality information as one parameter to a decision logic circuit or function which ultimately determines the transmit power level for the associated reverse link.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views.

DETAILED DESCRIPTION OF A PREFERRED EMBODIMENT

Figure 1:
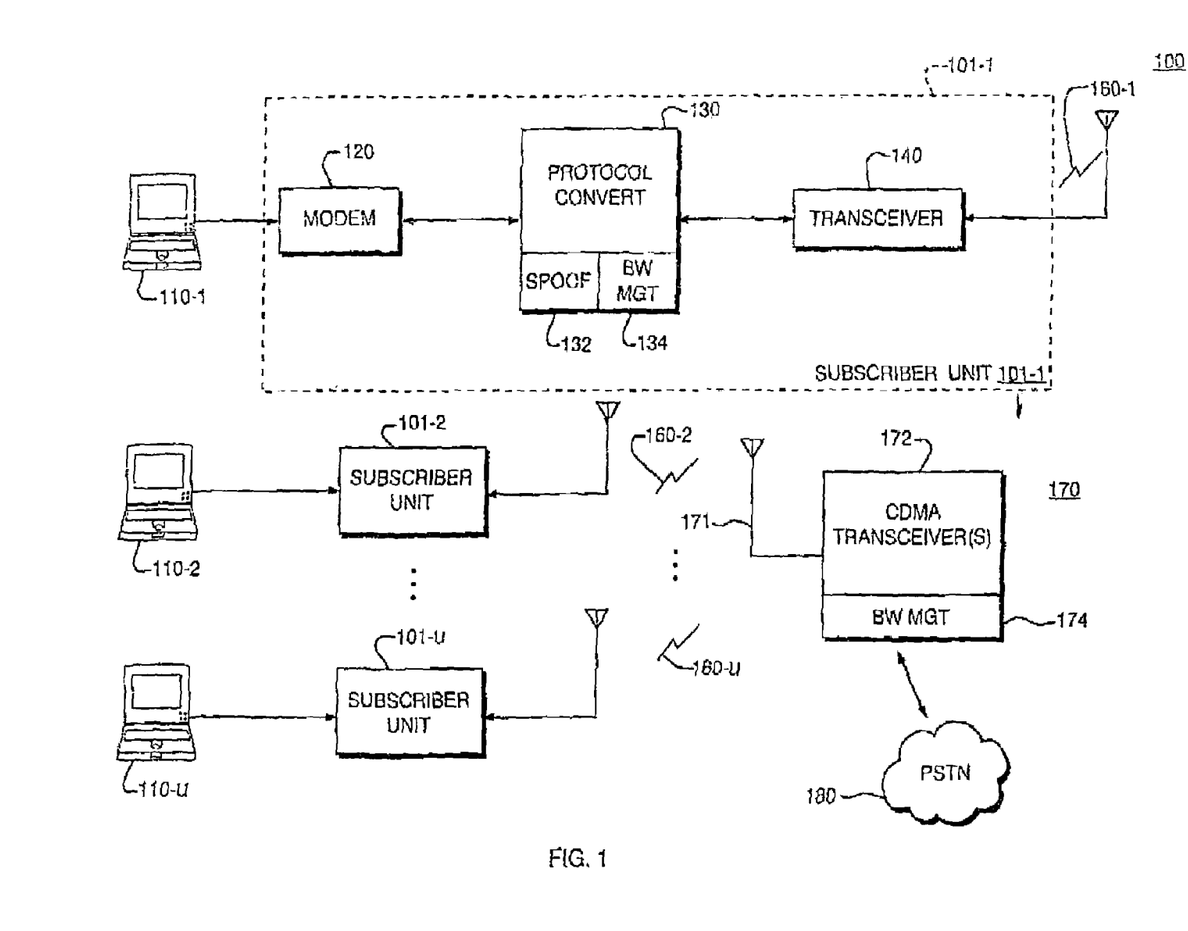
FIG. 1 is a block diagram of a wireless communication system making use of a bandwidth management scheme according to the invention.

Turning attention now to the drawings more particularly, FIG. 1 is a block diagram of a system 100 for providing high speed data and voice service over a wireless connection by seamlessly integrating a digital data protocol such as, for example, Integrated Services Digital Network (ISDN), with a digitally modulated wireless service, such as Code Division Multiple Access (CDMA).

The system 100 consists of two different types of components, including subscriber units 101-1, 101-2, ..., 101-u (collectively, the subscriber or mobile units 101) and one or more base stations 170. The subscriber units 101 and base stations 170 cooperate to provide the functions necessary in order to provide wireless data services to a portable computing device 110 such as a laptop computer, portable computer, personal digital assistant (PDA) or the like. The base station 170 also cooperates with the subscriber units 101 to permit the transmission of data between the subscriber unit and the Public Switched Telephone Network (PSTN) 180.

More particularly, data and/or voice services are also provided by the subscriber unit 101 to the portable computer 110 as well as one or more other devices such as telephones 112-1, 112-2 (collectively referred to herein as telephones 112). The telephones 112 themselves may in turn be connected to other modems and computers which are not shown in FIG. 1. In the usual parlance of ISDN, the portable computer 110 and telephones 112 are referred to as terminal equipment (TE). The subscriber unit 101 provides the functions referred to as a Network Termination Type 1 (NT-1). The illustrated subscriber unit 101 is in particular meant to operate with a so-called basic rate interface (BRI) type ISDN connection that provides two bearer or "B" channels and a single data or "D" channel with the usual designation being 2B+D.

The subscriber unit 101 itself consists of an ISDN modem 120, a device referred to herein as the protocol converter 130 that performs the various functions according to the invention including spoofing 132 and bandwidth management 134, a CDMA transceiver 140, and subscriber unit antenna 150. The various components of the subscriber unit 101 may be realized in discrete devices or as an integrated unit. For example, an existing conventional ISDN modem 120 such as is readily available from any number of manufacturers may be used together with existing CDMA transceivers 140. In this case, the unique functions are provided entirely by the protocol converter 130 which may be sold as a separate device. Alternatively, the ISDN modem 120, protocol converter 130, and CDMA transceiver 140 may be integrated as a complete unit and sold as a single subscriber unit device 101. Other types of interface connections such as Ethernet or PCMCIA may be used to connect the computing device to the protocol converter 130.

The ISDN modem 120 converts data and voice signals between the terminal equipment 110 and 112 to format required by the standard ISDN "U" interface. The U interface is a reference point in ISDN systems that designates a point of the connection between the network termination (NT) and the telephone company.

The protocol converter 130 performs spoofing 132 and basic bandwidth management 134 functions. In general, spoofing 132 consists of insuring that the subscriber unit 101 appears to the terminal equipment 110, 112 that is connected to the public switched telephone network 180 on the other side of the base station 170 at all times. The bandwidth management function 134 is responsible for allocating and deallocating CDMA radio channels 160, including management of the total bandwidth allocated to a given session by dynamically assigning sub-portions of the CDMA radio channels 160 in a manner which is also more fully described below.

The CDMA transceiver 140 accepts the data from the protocol converter 130 and reformats this data in appropriate form for transmission through a subscriber unit antenna 150 over CDMA radio link 160-1. The CDMA transceiver 140 may operate over only a single 1.2288 MHz radio frequency channel or, alternatively, in a preferred embodiment, may be tunable over multiple ones of such channels.

CDMA signal transmissions are then received and processed by the base station equipment 170. The base station equipment 170 typically consists of multichannel antennas 171, multiple CDMA transceivers 172, and a bandwidth management functionality 174. Bandwidth management 174 controls the allocation of CDMA radio channels 160 and subchannels, in a manner analogous to the subscriber unit 101. The base station 170 then couples the demodulated radio signals to the Public Switch Telephone Network (PSTN) 180 in a manner which is well known in the art. For example, the base station 170 may communicate with the PSTN 180 over any number of different efficient communication protocols such as primary rate ISDN, or other LAPD based protocols such as IS-634 or V5.2.

Continuing to refer to FIG. 1 briefly, bandwidth management 134 and 174 therefore involve having the CDMA transceiver 140 loop back data bits over the ISDN communication path to spoof the terminal equipment 110, 112 into believing that a sufficiently wide wireless communication link 160 is continuously available. However, only when there is actually data present from the terminal equipment to the wireless transceiver 140 is wireless bandwidth allocated. Therefore, a network layer connection need not allocate the assigned wireless bandwidth for the entirety of the communications session. That is, when data is not being presented upon the terminal equipment to the network equipment, the bandwidth management function 134 deallocates initially assigned radio channel bandwidth 160 and makes it available for another transceiver and another subscriber unit 101.

It should also be understood that data signals travel bidirectionally across the CDMA radio channels 160. In other words, data signals received from the PSTN 180 are coupled to the portable computer 110 in a so-called forward link direction, and data signals originating at the portable computer 110 are coupled to the PSTN 180 in a so-called reverse link direction. The present invention involves in particular the manner of implementing a power control mechanism for the reverse link channels.

Figure 2:
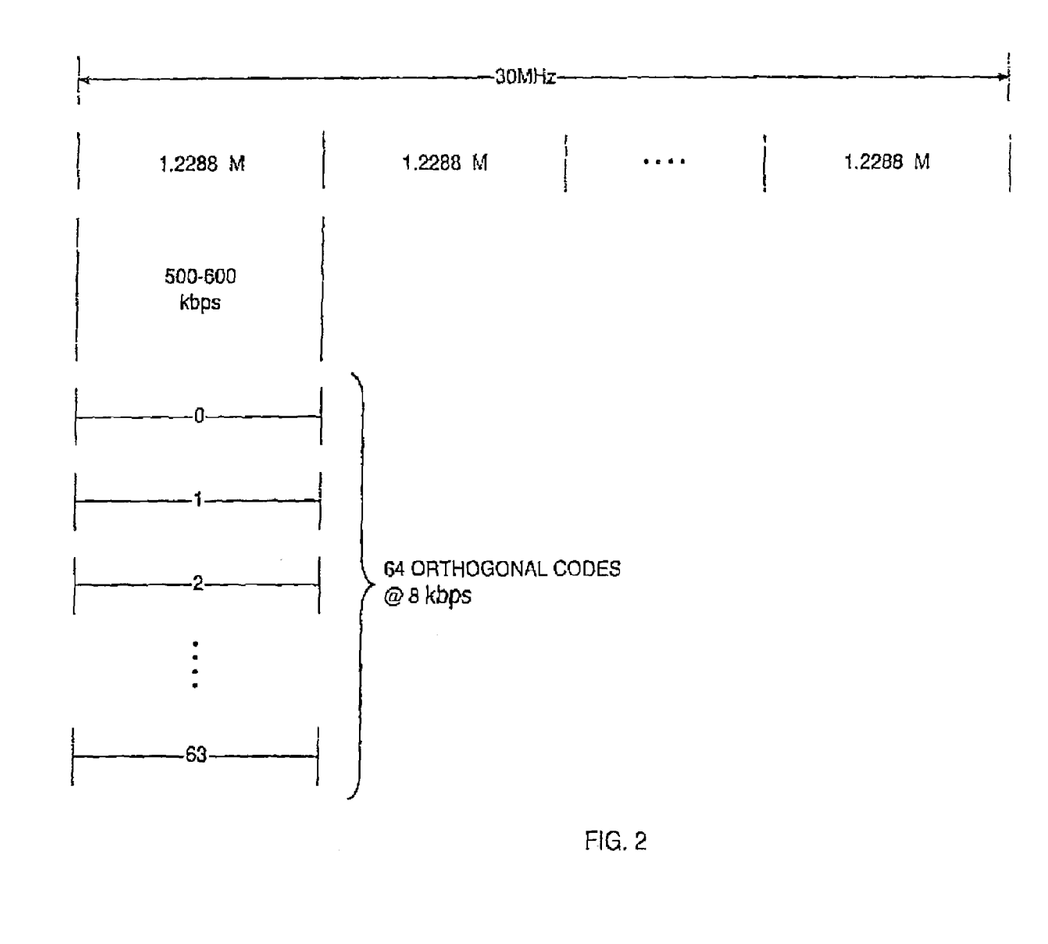
FIG. 2 is a diagram showing how subchannels are assigned within a given radio forward link frequency (RF) channel.

In order to better understand how bandwidth management 134 and 174 accomplish the dynamic allocation of radio channels, turn attention now to FIG. 2. This figure illustrates one possible frequency plan for the forward wireless links 160 according to the invention. In particular, a typical transceiver 170 can be tuned on command to any 1.2288 MHz channel within a much larger bandwidth, such as up to 30 MHz. In the case of location in an existing cellular radio frequency bands, these channels are typically made available in the range of from 800 to 900 MHZ. For personal communication systems (PCS) type wireless systems, the channels are typically allocated in the range from about 1.8 to 2.0 GigaHertz (GHz). In addition, there are typically two matching bands active simultaneously, separated by a guard band, such as 80 MHz; the two matching bands form the forward and reverse full duplex link.

Each of the CDMA transceivers, such as transceiver 140 in the subscriber unit 101, and transceivers 172 in the base station 170, are capable of being tuned at any given point in time to a given radio frequency channel. It is generally understood that, for example, a 1.2288 MHz radio frequency carrier provides, at best, a total equivalent of about 500 to 600 kbps maximum continuous data rate transmission within acceptable bit error rate limitations.

However, to make more efficient use of the available bandwidth, each 1.2288 MHz radio channel on the reverse link is divided into a relatively large number of subchannels. In the illustrated example, the bandwidth is divided into sixty-four (64) subchannels 300, each providing an 8 kbps data rate. A given subchannel 300 is physically implemented by encoding a transmission with one of a number of different assignable pseudorandom codes and/or code phases. For example, the 64 subchannels 300 may be defined within a single CDMA RF carrier by using a different code phase for each defined subchannel 300.

As mentioned above, subchannels 300 are allocated only as needed. For example, multiple subchannels 300 are granted during times when a particular ISDN subscriber unit 101 is requesting that large amounts of data be transferred. These subchannels 300 are quickly released during times when the subscriber unit 101 is relatively lightly loaded.

The present invention relates in particular to maintaining the reverse link so that a transmit power level for the subchannels does not need to be reestablished each time that subchannels are taken away and then granted back.

Figure 3:
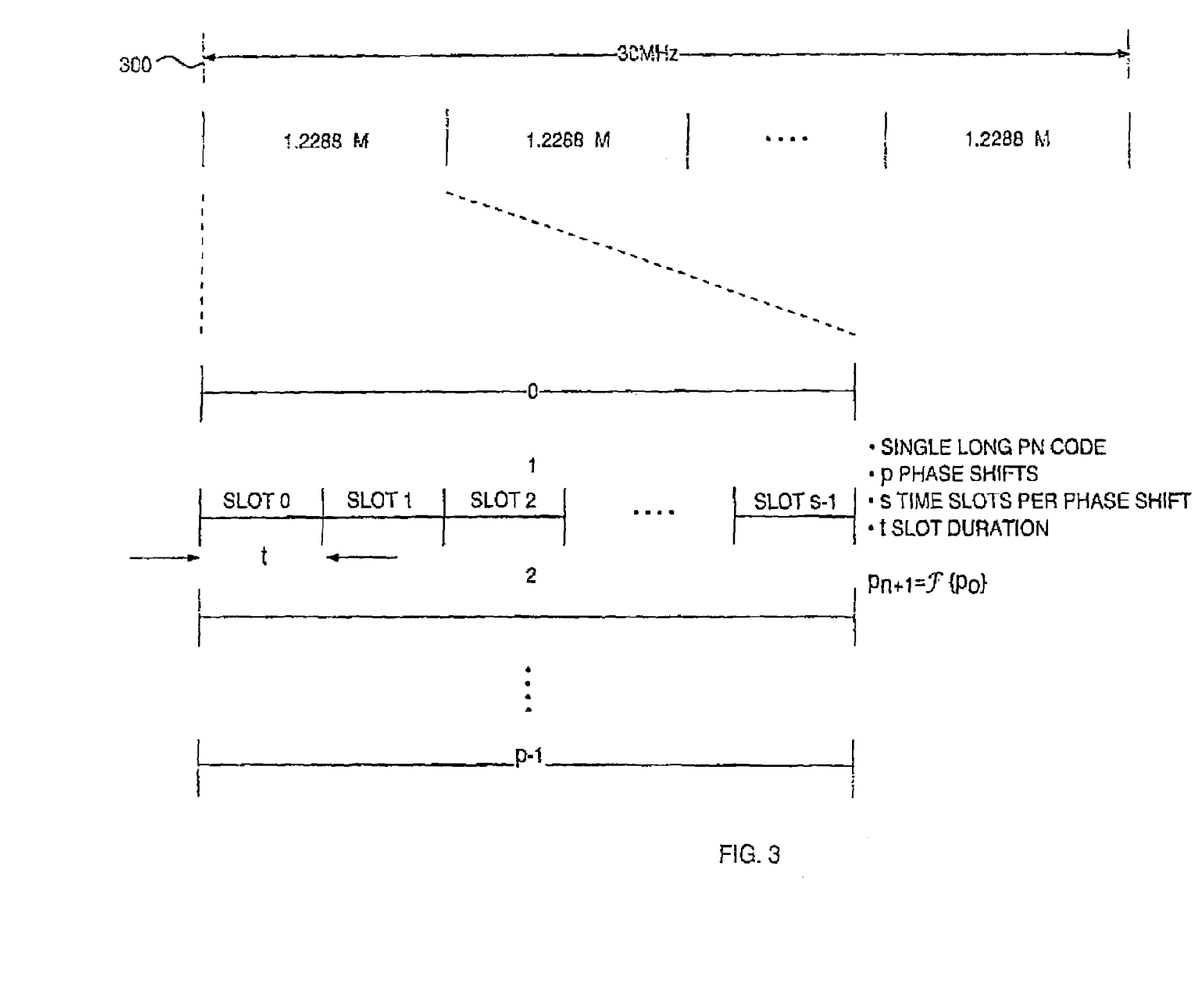
FIG. 3 is a diagram showing how subchannels are assigned within a given reverse link RF channel.

FIG. 3 is a diagram illustrating the arrangement of how the subchannels are assigned on the reverse link. It is desirable to use a single radio carrier signal on the reverse link to the extent possible to conserve power as well as to conserve the receiver resources which must be made available at the base station. Therefore, a single 1.2288 MHz channel 350 is selected out of the available radio spectrum.

A relatively large number, N, such as 1000 individual subscriber units are then supported by using a single long pseudonoise (PN) code in a particular way. First, a number, p, of phases of the code are selected from an available $2^{42}-1$ different code phases. The p code phase shifts are then used to provide p subchannels. Next, each of the p subchannels are further divided into s time slots. Therefore, the maximum supportable number of supportable subscriber units, N, is p times s. Use of the same PN code with different phases and time slots provides many different subchannels with permits using a single rake receiver in the base station 104.

In the above mentioned channel allocation scheme, radio resources are expected to be allocated on an as-needed basis. However, consideration must also be given to the fact that, in order set up a new CDMA channel, a given reverse link channel must normally be given time to not only acquire code phase lock, but also to adapt its transmission to the proper power level. The present invention avoids the need to wait for each channel to accomplish this each time that it is set up, by several mechanisms which are describe more fully below. In general, the technique is to send a maintenance signal at a sufficient rate for each subchannel even when it is in a standby mode; that is, even in the absence of data traffic.

One objective here is to minimize the size of each time slot, which in turn maximizes the number of subscribers that can be maintained in an idle mode. The size, t, of each time slot is determined by the minimum time that it takes to guarantee phase lock between the transmitter at the subscriber unit and the receiver in the base station. In particular, a code correlator in the receiver must receive a maintenance or "heartbeat" signal consisting of at least a certain number of maintenance bits over a certain unit of time. In the limit, this heartbeat signal is sent by sending at least one bit from each subscriber unit on each reverse link at a predetermined time, e.g., its designated time slot on a predetermined one of the N subchannels.

The minimum time slot duration, t, therefore depends upon a number of factors including the signal to noise ratio and the expected maximum velocity of the subscriber unit within the cell. With respect to signal to noise ratio, this depends on $$Eb/(No+Io)$$

where Eb is the energy per bit, No is the ambient noise floor, and Io is the mutual interference from other coded transmissions of the other sub-channels on the reverse link sharing the same spectrum. Typically, to close the link requires integration over 8 chip times at the receiver, and a multiple of 20 times that is typically needed to guarantee detection. Therefore, about 160 chip times are typically required to correctly receive the coded signal on the reverse link. For a 1.2288 MHz code, Tc, the chip time, is 813.33 ns, so that this minimum integration time is about 130 $\mu$s. This in turn sets the absolute minimum duration of a data bit, and therefore, the minimum duration of a slot time, t. The minimum slot time of 130 $\mu$s means that at a maximum, 7692 time slots can be made available per second for each phase coded signal.

Once code phase lock is acquired, the duration of the heartbeat signal is determined by considering the capture or locking range of the code phase locking circuits in the receiver at the base station. For example, the receiver typically has a PN code correlator running at the code chip rate. One example of such a code correlator uses a delay lock loop consisting of an early-late detector. A loop filter controls the bandwidth of this loop which in turn determines how long the code correlator must be allowed to operate before it can guarantee phase lock. This loop time constant determines the amount of "jitter" that can be tolerated in the code correlator, such as about ⅛ of a chip time, Tc.

In the preferred embodiment, the system 100 is intended to support so-called nomadic mobility. That is, high mobility operation within moving vehicles typical of cellular telephony is not expected to be necessary. Rather, the typical user of a portable computer who is active is moving at only brisk walking speeds of about 4.5 miles per hour (MPH). At 4.5 MPH, corresponding to a velocity of 6.6 feet per second, a user will move 101 feet in ⅛ of the $1/1.2288$ MHz chip time (Tc). Therefore, it will take about 101 feet divided by 6.6 feet, or about 15 seconds for such a user to move distance which is sufficiently far for him to a point where the code phase synchronization loop cannot be guaranteed to remain locked. Therefore, as long as a complete synchronization signal is sent on a given reverse link channel every 15 seconds, the reverse link loop will therefore be maintained. In practice, it is preferred not to push this to the limit, and a synchronization heartbeat signal is sent every several seconds.

Figure 4:
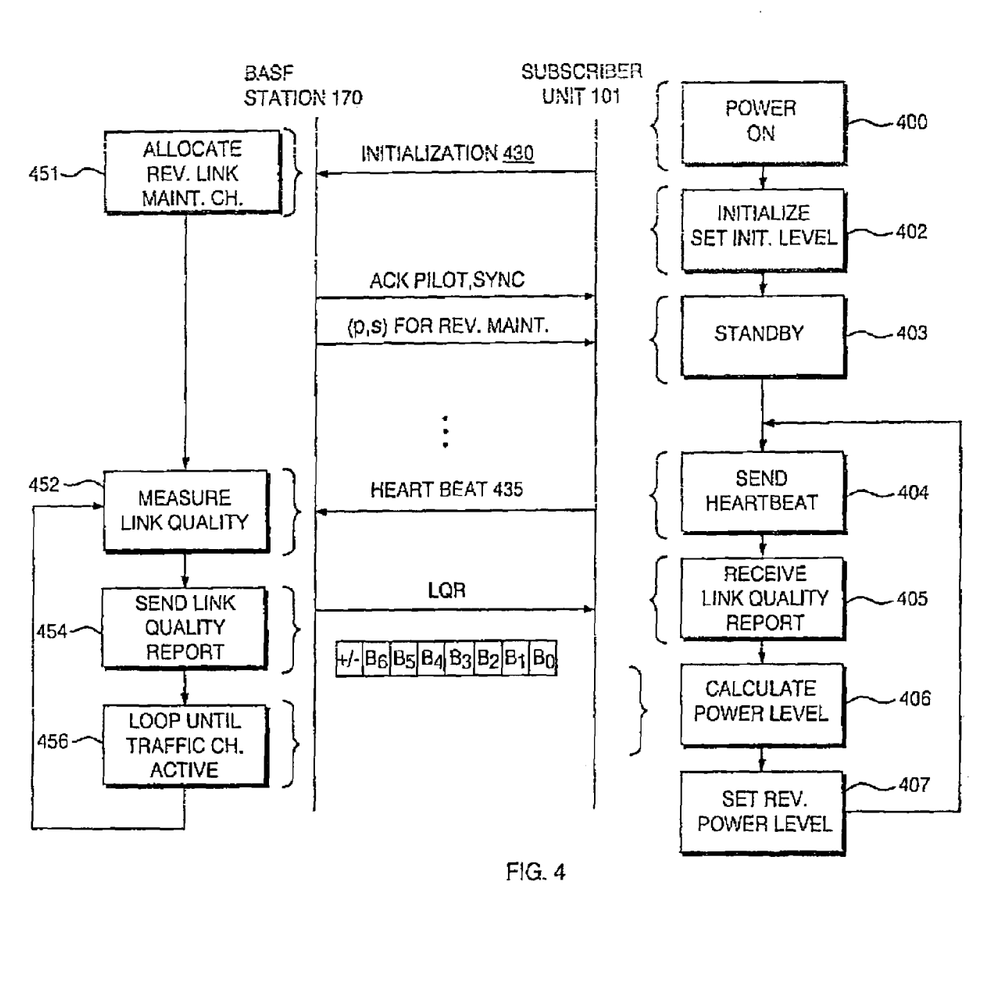
FIG. 4 is a state diagram for a link quality messaging scheme according to the invention.

FIG. 4 is a state diagram showing a set of operations performed by the base station 170 and subscriber units 101. The sequence of states entered into by the base station 170 are generally illustrated on the left hand side of the figure, and the sequence of states for the subscriber unit 101 on the right hand side.

In a first state 400, the subscriber 101 is initialized such as by turning on its battery power. The subscriber unit 101 then sends an initialization message to the base station 170. In this initialization state 402, the subscriber performs system determination, pilot channel acquisition, sync channel acquisition, and other timing functions as specified, for example, by the IS-95B air interface standard. In effect, subscriber 101 determines the type of system in which it is operating, for example, a dual mode CDMA or analog mode, acquires acquisition on the pilot channel by synchronizing its timing circuits, and also does a similar timing function on the sync channel. In addition, an initial default open loop reverse power level may be determined such as by measuring a power level received on a forward link, as in known in the art. If the subscriber 101 can perform all of these tasks within a certain specified period of time, then it may successfully enter a standby mode state 403.

After it is initialized, the subscriber unit 101 may inform the base station 120 of its successful completion of such tasks by sending an initialization message 430 to the base 170. The base station 120 then enters a state 450 where it allocates a reverse link maintenance channel to the particular subscriber 101. This can be done after acknowledging pilot and synchronization, by sending a code phase p and time slot s to be used for this particular subscriber unit in a message. Such a message may be, for example, sent on the forward link paging channel which the subscriber unit 101 continues to monitor during the standby mode state 403.

Also while in the standby state 403, once an open loop power level is set, the subscriber 101 periodically enters a state 404 in which a heartbeat message is sent to the base station 120 over the reverse link.

Once the base station 170 receives such a heartbeat message, it enters a state 452 in which it determines a link quality metric for the reverse link signal received from the subscriber unit 101.

Next, in state 454, this reverse link quality metric is sent as a link quality report (LQR) message over the reverse link to the subscriber unit 101. The LQR message is sent over a paging or sync channel since no traffic channel is available during the standby mode.

The LQR may, for example, contain eight (8) bits of information. The link quality metric may be a bit error rate, a noise energy level expressed as $E_b/N_{o1}$ or a power level.

Upon receiving the LQR, subscriber unit enters state 406 in which it calculates its reverse power level using the received LQR and other information.

The subscriber unit then continues to iterate through states 404 through 407 in order to maintain an appropriate power level while in standby mode, until the subscriber unit receives a message indicating that it is to enter an active mode or otherwise leave standby mode.

Similarly, on the base station side, states 452, 454, and 456 are repeated for each of the standby subscriber units while it is in the idle state.

The heartbeat signal 435 is sent to synchronization message on the assigned maintenance channel at a data rate which need only be fast enough to allow the subscriber unit 101 to maintain synchronization with the base station 170. The duration of the heartbeat signal is determined by considering the capture range of the code phase locking circuits and the receiver circuits and the base station 170.

In a preferred embodiment, the system is intended to support so-called nomadic mobility. That is, the relatively high mobility operation such as within moving vehicles typical of cellular telephony is not expected to be encountered. Rather, the typical user of a portable computer is expected to remain connected only when moving about at brisk walking speed at about 4.5 miles per hour. In this situation, a user will move approximately 100 feet and ⅛ of the chip time at 1.2288 MHz. Therefore, it takes about 100 feet divided by 6.6 feet or about 15 seconds for such a user to move a distance which is sufficiently far to a point where a code phase synchronization cannot be guaranteed. Therefore, as long as a complete heartbeat signal and power control word for a given reverse link channel are exchanged every 15 seconds, the reverse link will remain at the closed loop power level desired.

For further information concerning the arrangement of the heartbeat signal, please refer to a co-pending patent application entitled "Fast Acquisition of Traffic Channels for a Highly Variable Data Rate Reverse Link of a CDMA Wireless Communication System," filed on Jun. 1, 1998, given Ser. No. 09/088,413, and assigned to the same assignee of the present invention, the entire contents of which are hereby incorporated by reference.

It can now be understood how the present invention implements closed loop power control in a code division multiple access system that dynamically assigns reverse link traffic channels, even when such traffic channels are not allocated. This is accomplished by the base station determining link quality measurement based on a reverse link received signal that is received in response to maintenance heartbeat signals. The heartbeat signals are sent in a rate which is only sufficiently fast to maintain code phase lock. In response to this, a link quality report message is sent back to the subscriber unit on the forward link, such as on a paging or sync channel.

Equivalents

While this invention has been particularly shown and described with references to preferred embodiments thereof, it will be understood by those skilled in the art that various changes in form and details may be made therein without departing from the spirit and scope of the invention as defined by the appended claims.

For example, instead of ISDN, other wireline and network protocols may be encapsulated, such as Digital Subscriber Loop (xDSL), Ethernet, or X.25, and therefore may advantageously use the dynamic wireless subchannel assignment scheme described herein.

Those skilled in the art will recognize or be able to ascertain using no more than routine experimentation, many equivalents to the specific embodiments of the invention described specifically herein. Such equivalents are intended to be encompassed in the scope of the claims.

What is claimed is:

1. A method for providing wireless communication of digital signals, the digital signals being communicated between a plurality of wireless subscriber units and a base station, the digital signals being communicated using at least one radio frequency channel via Code Division Multiple Access (CDMA) modulated radio signals, the digital signals also having a given nominal data rate, the method comprising the steps of:

a) making available a plurality of subchannels within each CDMA radio channel, wherein a data rate of each subchannel is much less than the nominal data rate of the digital signals;

b) allocating available subchannels only on an as-needed basis, with the number of subchannels allocated thereby changing during the duration of a given session;

c) on a reverse link, providing a standby mode connection for subscriber units which are powered on, but not presently having traffic channels allocated, the standby mode connection sending a heartbeat signal from the subscriber unit to the base station, the heartbeat signal being sent from the subscriber unit to the base station at a data rate which is sufficiently fast enough to maintain bit synchronization on the reverse link; and d) during the standby mode, sending a link quality report message to the subscriber unit in response to the heartbeat signal, the link quality report message containing a link quality report that is used to control the transmit power level of the subscriber unit.

2. A method for providing wireless communication of digital signals, the digital signals being communicated between a plurality of wireless subscriber units a base station, the digital signals being communicated using at least one radio frequency channel via Code Division Multiple Access (CDMA) modulated radio signals, the digital signals also having a given nominal data rate, the method comprising the steps of:

a) making available a plurality of subchannels within each CDMA radio channel, wherein a data rate of each subchannel is much less than the nominal data rate of the digital signals;

b) allocating available subchannels only on an as-needed basis, with the number of subchannels allocated thereby changing during the duration of a given session;

c) on a reverse link, providing a standby mode connection for subscriber units which are powered on, but not presently actively sending data, the standby mode connection sending a heartbeat signal from the subscriber unit to the base station, the heartbeat signal being sent from the subscriber unit to the base station at a data rate which is sufficiently fast enough to maintain bit synchronization on the reverse link, the heartbeat signal being time slotted between inactive subchannels; and d) during the standby mode, sending a link quality report message to the subscriber unit in response to the heartbeat signal, the link quality report message containing a link quality report that is used to control the transmit power level of the subscriber unit.

3. A method as in claim 1 or 2 wherein a plurality of subchannels are made available on a single radio frequency carrier by assigning different codes for each subchannel.

4. A method as in claim 1 or 2 wherein the link quality report message is sent on a pilot channel.

5. A method as in claim 1 or 2 wherein the link quality report message is sent on a sync channel.

6. A method as in claim 1 or 2 wherein the link quality report contains a data value indicating an amount by which the subscriber unit should change its transmit power level for the corresponding subchannel.

7. A method as in claim 1 or 2 wherein the link quality report contains a data value indicating a bit error rate.

8. A method as in claim 1 or 2 wherein the link quality report contains a value indicating noise energy.

9. A method as in claim 1 or 2 additionally comprising the step of:
   calculating a subscriber unit transmit power level using a data value indicated by the link quality report.

10. A method as in claim 1 or 2 wherein the link quality report message is sent on a paging channel.

11. A system for providing wireless communication of digital signals, the digital signals being communicated between a plurality of wireless subscriber units and a base station, the digital signals being communicated using at least one radio frequency channel via Code Division Multiple Access (CDMA) modulated radio signals, the digital signals also having a given nominal data rate, the system having a base station comprising:
   a radio transceiver making available a plurality of subchannels within each CDMA radio channel, wherein a data rate of each subchannel is much less than the nominal data rate of the digital signals;
   a bandwidth manager allocating available subchannels only on an as-needed basis, with the number of subchannels allocated thereby changing during the duration of a given session;
   the bandwidth manager providing a standby mode connection on a reverse link for subscriber units which are powered on, but not presently having traffic channels allocated;
   the radio transceiver receiving a heartbeat signal over the standby mode connection from a subscriber unit at a data rate which is sufficiently fast enough to maintain bit synchronization on the reverse link; and
   the radio transceiver sending a link quality report message to the subscriber unit during the standby mode in response to the heartbeat signal, the link quality report message containing a link quality report that is used to control the transmit power level of the subscriber unit.

12. A system for providing wireless communication of digital signals, the digital signals being communicated between a plurality of wireless subscriber units and a base station, the digital signals being communicated using at least one radio frequency channel via Code Division Multiple Access (CDMA) modulated radio signals, the digital signals also having a given nominal data rate, the system having a base station comprising:
   a radio transceiver making available a plurality of subchannels within each CDMA radio channel, wherein a data rate of each subchannel is much less than the nominal data rate of the digital signals;
   a bandwidth manager allocating available subchannels only on an as-needed basis, with the number of subchannels allocated thereby changing during the duration of a given session;
   the bandwidth manager providing a standby mode connection on a reverse link for subscriber units which are powered on, but not presently actively sending data;
   the radio transceiver receiving a heartbeat signal over the standby mode connection from a subscriber unit at a data rate which is sufficiently fast enough to maintain bit synchronization on the reverse link, the heartbeat signal being time slotted between inactive subchannels; and
   the radio transceiver sending a link quality report message to the subscriber unit during the standby mode in response to the heartbeat signal, the link quality report message containing a link quality report that is used to control the transmit power level of the subscriber unit.

13. A system as in claim 11 or 12 wherein the radio transceiver provides a plurality of subchannels on a single radio frequency carrier by assigning different codes for each subchannel.

14. A system as in claim 11 or 12 wherein the link quality report message is sent on a pilot channel.

15. A system as in claim 11 or 12 wherein the link quality report message is sent on a sync channel.

16. A system as in claim 11 or 12 wherein the link quality report contains a data value indicating an amount by which the subscriber unit should change its transmit power level for the corresponding subchannel.

17. A system as in claim 11 or 12 wherein the link quality report contains a data value indicating a bit error rate.

18. A system as in claim 11 or 12 wherein the link quality report contains a value indicating noise energy.

19. A system as in claim 11 or 12 wherein the link quality report message is sent on a paging channel.

20. A system for providing wireless communication of digital signals, the digital signals being communicated between a plurality of wireless subscriber units and a base station, the digital signals being communicated using at least one radio frequency channel via Code Division Multiple Access (CDMA) modulated radio signals, the digital signals also having a given nominal data rate, the system having a base station comprising:
   transceiver means for making available a plurality of subchannels within each CDMA radio channel, wherein a data rate of each subchannel is much less than the nominal data rate of the digital signals;
   bandwidth management means for allocating available subchannels only on an as-needed basis, with the number of subchannels allocated thereby changing during the duration of a given session;
   the bandwidth management means providing a standby mode connection on a reverse link for subscriber units which are powered on, but not presently having traffic channels allocated;
   the transceiver means receiving a heartbeat signal over the standby mode connection from a subscriber unit at a data rate which is sufficiently fast enough to maintain bit synchronization on the reverse link; and
   the transceiver means sending a link quality report message to the subscriber unit during the standby mode in response to the heartbeat signal, the link quality report message containing a link quality report that is used to control the transmit power level of the subscriber unit.

21. A system for providing wireless communication of digital signals, the digital signals being communicated between a plurality of wireless subscriber units and a base station, the digital signals being communicated using at least one radio frequency channel via Code Division Multiple Access (CDMA) modulated radio signals, the digital signals also having a given nominal data rate, the system having a subscriber unit comprising:
   a radio transceiver tuning to at least one subchannel of a plurality of subchannels within a CDMA radio channel, wherein a data rate of each subchannel is much less than the nominal data rate of the digital signals;
   a bandwidth manager allocating the at least one subchannel only on an as-needed basis, with the number of subchannels allocated thereby changing during the duration of a given session;

the bandwidth manager opening a standby mode connection on a reverse link during a standby mode, the bandwidth manager not presently having traffic channels allocated;

the radio transceiver sending a heartbeat signal over the standby mode connection to a base station at a data rate which is sufficiently fast enough to maintain bit synchronization on the reverse link; and the radio transceiver receiving a link quality report message from the base station during the standby mode in response to the heartbeat signal, the link quality report message containing a link quality report that is used to control the transmit power level of the subscriber unit.

22. A system for providing wireless communication of digital signals, the digital signals being communicated between a plurality of wireless subscriber units and a base station, the digital signals being communicated using at least one radio frequency channel via Code Division Multiple Access (CDMA) modulated radio signals, the digital signals also having a given nominal data rate, the system having a subscriber unit comprising:

a radio transceiver tuning to at least one subchannel of a plurality of subchannels within a CDMA radio channel, wherein a data rate of each subchannel is much less than the nominal data rate of the digital signals;

a bandwidth manager allocating the at least one subchannel only on an as-needed basis, with the number of subchannels allocated thereby changing during the duration of a given session;

the bandwidth manager opening a standby mode connection on a reverse link during a standby mode, the bandwidth manager not presently having traffic channels allocated;

the radio transceiver sending a heartbeat signal over the standby mode connection to a base station at a data rate which is sufficiently fast enough to maintain bit synchronization on the reverse link, the heartbeat signal being time slotted between inactive subchannels; and the radio transceiver receiving a link quality report message from the base station during the standby mode in response to the heartbeat signal, the link quality report message containing a link quality report that is used to control the transmit power level of the subscriber unit.

23. A system as in claim 21 or 22 wherein the link quality report message is received on a pilot channel.

24. A system as in claim 21 or 22 wherein the link quality report message is received on a sync channel.

25. A system as in claim 21 or 22 wherein the link quality report contains a data value indicating an amount by which the subscriber unit should change its transmit power level for the corresponding subchannel.

26. A system as in claim 21 or 22 wherein the link quality report contains a data value indicating a bit error rate.

27. A system as in claim 21 or 22 wherein the link quality report contains a value indicating noise energy.

28. A system as in claim 21 or 22 wherein a subscriber unit transmit power level is calculated using a data value indicated by the link quality report.

29. A system as in claim 21 or 22 wherein the link quality report message is received on a paging channel.

30. A system for providing wireless communication of digital signals, the digital signals being communicated between a plurality of wireless subscriber units and a base station, the digital signals being communicated using at least one radio frequency channel via Code Division Multiple Access (CDMA) modulated radio signals, the digital signals also having a given nominal data rate, the system having a subscriber unit comprising:

transceiver means for tuning to at least one subchannel of a plurality of subchannels within a CDMA radio channel, wherein a data rate of each subchannel is much less than the nominal data rate of the digital signals;

bandwidth management means for allocating the at least one subchannel only on an as-needed basis, with the number of subchannels allocated thereby changing during the duration of a given session;

the bandwidth management means opening a standby mode connection on a reverse link during a standby mode, the bandwidth manager not presently having traffic channels allocated;

the transceiver means sending a heartbeat signal over the standby mode connection to a base station at a data rate which is sufficiently fast enough to maintain bit synchronization on the reverse link; and the transceiver means receiving a link quality report message from the base station during the standby mode in response to the heartbeat signal, the link quality report message containing a link quality report that is used to control the transmit power level of the subscriber unit.

* * * * *